(12) United States Patent
Bhatti et al.

(10) Patent No.: US 7,957,301 B2
(45) Date of Patent: Jun. 7, 2011

(54) METHOD, APPARATUS AND SYSTEM FOR MULTICAST COMMUNICATION IN A WIRELESS MULTI-HOP NETWORK

(75) Inventors: Ghulam M. Bhatti, Mansfield, MA (US); Gaofeng Yue, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 626 days.

(21) Appl. No.: 12/063,707

(22) PCT Filed: Aug. 15, 2005

(86) PCT No.: PCT/US2005/028841
§ 371 (c)(1),
(2), (4) Date: Jun. 2, 2008

(87) PCT Pub. No.: WO2007/021269
PCT Pub. Date: Feb. 22, 2007

(65) Prior Publication Data
US 2009/0201844 A1    Aug. 13, 2009

(51) Int. Cl.
*H04L 12/56* (2006.01)

(52) U.S. Cl. ........................................ 370/248; 370/432
(58) Field of Classification Search .................. 370/337, 370/344, 347, 248, 252, 432
See application file for complete search history.

(56) References Cited

U.S. PATENT DOCUMENTS

| | | | | |
|---|---|---|---|---|
| 5,946,316 A * | 8/1999 | Chen et al. | ................... | 370/408 |
| 2003/0037177 A1 * | 2/2003 | Sutton et al. | ................... | 709/316 |
| 2004/0218536 A1 * | 11/2004 | Yasukawa et al. | ............. | 370/238 |
| 2004/0246984 A1 * | 12/2004 | Hundscheidt et al. | ......... | 370/432 |
| 2005/0136972 A1 * | 6/2005 | Smith et al. | ................. | 455/554.1 |
| 2005/0180447 A1 * | 8/2005 | Lim et al. | ...................... | 370/432 |
| 2005/0232281 A1 * | 10/2005 | Rosenzweig et al. | .......... | 370/400 |
| 2007/0177594 A1 * | 8/2007 | Kompella | ...................... | 370/390 |

* cited by examiner

*Primary Examiner* — Melvin Marcelo
(74) *Attorney, Agent, or Firm* — Dirk Brinkman; Gene Vinokur (57) ABSTRACT

A method for multicast communication in a network having plural nodes according to the ZigBee network specification includes creating a multicast group including a subset of the plural nodes and excluding at least one non-member node in the plural nodes. The multicast group has a multicast address. The method also includes transmitting multicast message including the multicast address and receiving the multicast message at each node in the multicast group.

34 Claims, 6 Drawing Sheets

METHOD, APPARATUS AND SYSTEM FOR MULTICAST COMMUNICATION IN A WIRELESS MULTI-HOP NETWORK

BACKGROUND OF THE INVENTION

1. Field of the Invention

This invention relates in general to communicating with a subset of nodes in a wireless network. In particular, the invention relates to a method, apparatus and system for multicast communication with a subset of nodes in a general wireless ad hoc network or in a network of nodes that comply with the ZigBee network standard specification.

2. Discussion of the Background

Conventional communication network protocols may include a method of sending a message to one or more specifically addressed nodes (i.e., unicast communication), and may also include a method of sending a message to all nodes in a network or network segment (i.e., broadcast communication). However, conventional communication network protocols may not include an efficient method of sending messages to a particular subset of nodes using a single address (i.e., multicast communication).

Charles E. Perkins and Elizabeth Royer, "Ad-hoc On-Demand Distance Vector Routing", Proceedings of the 2nd IEEE Workshop on Mobile Computing Systems and Applications, New Orleans, La., February 1999, pp. 90-100, incorporated by reference herein in its entirety, describes a conventional routing protocol called On-Demand Distance Vector Routing (AODV) that may be used for route discovery between pairs of nodes in general wireless ad hoc networks. Elizabeth Royer and Charles E. Perkins, "Multicast Operation of the Ad-hoc On-Demand Distance Vector Routing Protocol", Proceedings of MobiCom '99, Seattle, Wash., August 1999, pp. 207-218, incorporated by reference herein in its entirety, describes an extension of AODV called Multicast On-Demand Distance Vector Routing (MAODV) to establish multicast groups in general wireless ad hoc networks.

However, there are some problems and inefficiencies associated with the MAODV multicast approach. MAODV uses only a simple hop count as a measure of routing cost, which may be an unreliable metric. Further, MAODV is presented in the literature as merely a method to establish multicast groups in general ad hoc networks, but the description of MAODV does not take into consideration any specific network or application scenarios, and does not solve the problem of identifying a particular method of data delivery to nodes in the established multicast group. In addition, MAODV relies on existing unicast RREQ and RREP command frames to perform multicast join functions, MAODV uses the MACT command frame during both selected route activation and while a node is leaving a multicast group, and MAODV may make excessive use of inefficient network level broadcast messages for message propagation.

SUMMARY OF THE INVENTION

According to one embodiment of the present invention there is provided a novel method for multicast communication in a network having plural nodes according to the ZigBee network specification. The method includes creating a multicast group that includes a subset of the plural nodes and excludes at least one non-member node in the plural nodes, the multicast group having a multicast address; transmitting a multicast message including the multicast address; and receiving the multicast message at each node in the multicast group.

According to another embodiment of the present invention there is provided a novel method for multicast communication in a network having plural nodes. The method includes creating a multicast group that includes a subset of the plural nodes and excludes at least one non-member node in the plural nodes, the multicast group having a multicast address; sending a join request (JREQ) message from a joining node seeking to join the multicast group to a receiving node; sending a join reply (JREP) message from the receiving node to the joining node, the JREP message including a path cost to a node in the multicast group from the joining node; transmitting a multicast message including the multicast address; and receiving the multicast message at each node in the multicast group.

According to another embodiment of the present invention there is provided a novel node apparatus in a network having plural nodes according to the ZigBee network specification. The node includes a multicast group creating section configured to create a multicast group that includes a subset of the plural nodes and excludes at least one non-member node in the plural nodes, the multicast group having a multicast address; and a multicast message transmitting section configured to transmit a multicast message to the multicast group including the multicast address.

According to another embodiment of the present invention there is provided a novel node apparatus in a network having plural nodes. The apparatus includes a creating section configured to create a multicast group that includes a subset of the plural nodes and excludes at least one non-member node in the plural nodes, the multicast group having a multicast address; a join request (JREQ) message sending section configured to send a JREQ message to join the multicast group; a join reply (JREP) message sending section configured to send a JREP message including a path cost to a node in the multicast group; and a multicast message transmitting section configured to transmit a multicast message the multicast group including the multicast address.

According to another embodiment of the present invention there is provided a novel communication system that includes plural nodes according to the ZigBee network specification. Each node includes a multicast group creating section configured to create a multicast group that includes a subset of the plural nodes and excludes at least one non-member node in the plural nodes, the multicast group having a multicast address; and a multicast message transmitting section configured to transmit a multicast message to the multicast group including the multicast address.

According to another embodiment of the present invention there is provided a novel communication system having plural nodes. Each node includes a creating section configured to create a multicast group that includes a subset of the plural nodes and excludes at least one non-member node in the plural nodes, the multicast group having a multicast address; a join request (JREQ) message sending section configured to send a JREQ message to join the multicast group; a join reply (JREP) message sending section configured to send a JREP message including a path cost to a node in the multicast group; and a multicast message transmitting section configured to transmit a multicast message the multicast group including the multicast address.

According to another embodiment of the present invention there is provided a novel computer program product storing a program which when executed by a processor in a node in a communication network having plural nodes according to the ZigBee network specification causes the processor to perform creating a multicast group that includes a subset of the plural nodes and excludes at least one non-member node in the plural nodes, the multicast group having a multicast address; transmitting a multicast message including the multicast address; and receiving the multicast message at each node in the multicast group.

According to another embodiment of the present invention there is provided a novel computer program product storing a program which when executed by a processor in a node in a communication network having plural nodes causes the processor to perform creating a multicast group that includes a subset of the plural nodes and excludes at least one non-member node in the plural nodes, the multicast group having a multicast address; sending a join request (JREQ) message from a joining node seeking to join the multicast group to a receiving node; sending a join reply (JREP) message from the receiving node to the joining node, the JREP message including a path cost to a node in the multicast group from the joining node; transmitting a multicast message including the multicast address; and receiving the multicast message at each node in the multicast group.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
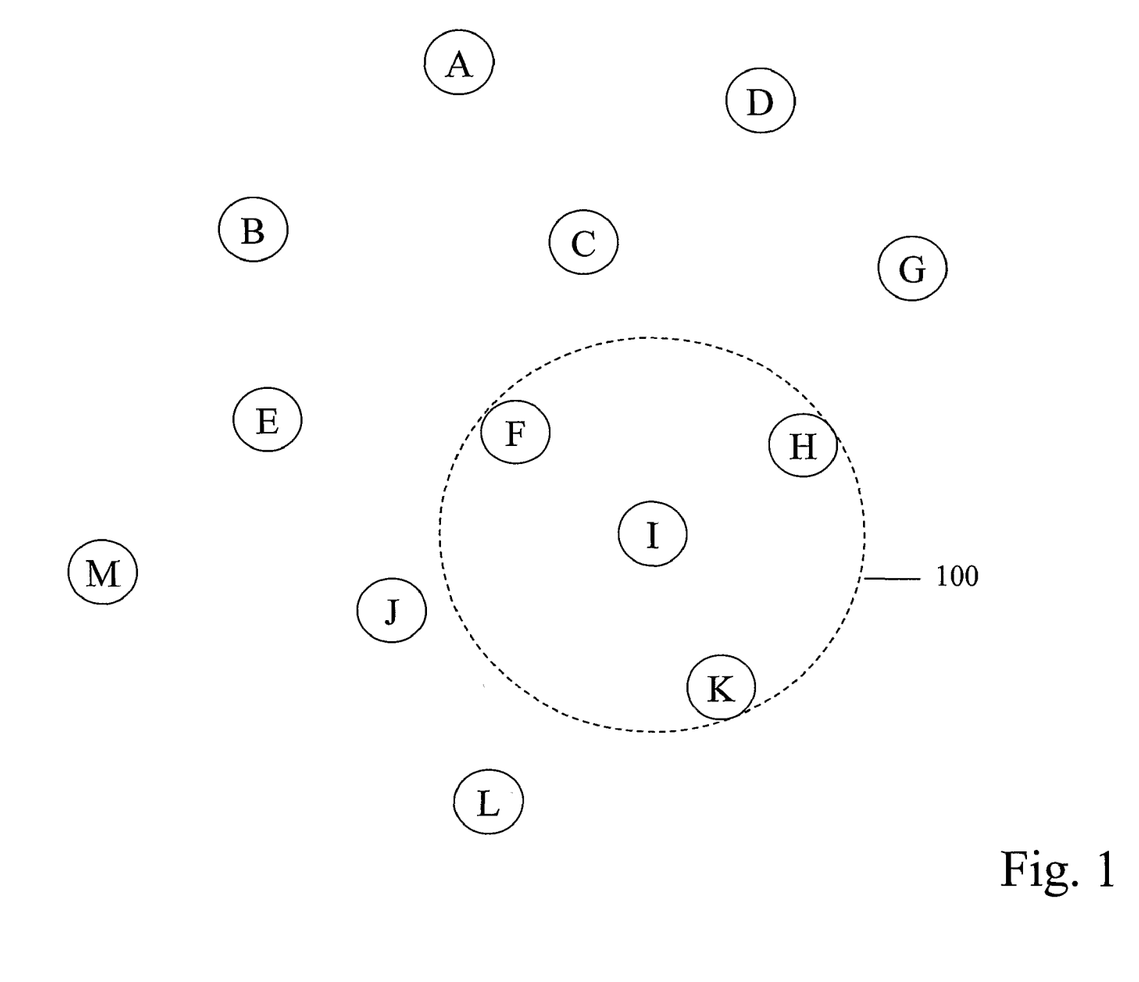
FIG. 1 is a schematic diagram of nodes in a communication network according to an embodiment of the present invention.

Referring now to the drawings, wherein like reference numerals designate identical or corresponding parts throughout the several views, FIG. 1 shows an example of a wireless communication network, such as a ZigBee standard network, having plural communication nodes A-M. Each node has a particular single-hop wireless communication range as determined by factors including the environment, power, antenna configuration, protocol, etc. For example, a single-hop wireless communication range of node I is indicated by circle 100. Thus, each node in the network may not be within a single-hop wireless communication range of each other network node. Accordingly, multi-hop communication may be used within such a network to send messages from node to node so that a particular node may be able to send a message to another node outside its communication range. Further, multi-hop communication is used in multicast group communication to a subset of network nodes that are members of a multicast group according to the present invention.

During the functional life of a multicast group according to the present invention, each member node plays a specific role to facilitate communication among the member nodes of the multicast group. We define several terms to specify the role of nodes in the multicast tree and for the description of the protocol:

| | |
|---|---|
| Group Leader (GL) | multicast group leader |
| Group Member (GM) | a node in a multicast group |
| On-Tree Node (OnTN) | part of a multicast tree but not a GM or GL |
| Off-Tree Node (OffTN) | a node not on a multicast tree |

In addition, the following control messages are defined for multicast operations according to the present invention:

| | |
|---|---|
| JREQ | Join Request |
| JREP | Join Reply |
| MACT | Multicast Activation |
| LREQ | Leave request |

A multicast group in a wireless network according to the present invention may be started by a single node and the group may later be joined by other nodes. Each multicast group has a number or address assigned to it in order to uniquely identify the multicast group within the network. If a node seeks to join a multicast group, the node first obtains the multicast address of the group. A node may obtain the multicast address by various means including receiving the address via a higher level protocol.

The joining node includes the multicast address in a join request sent by the joining node. Each network employs a particular method for assignment of unique addresses to each multicast groups, for example in a higher level protocol. Alternatively, a node, while starting up a new multicast group, can choose a number based upon an algorithm shared by nodes in the network as the group address of a new group and transmit a join request using that address. If the joining node receives no response in a predetermined time period, the joining node may assume that a multicast group with the transmitted address does not exist. In such a case, it can start a new multicast group with that address.

One or more nodes in a wireless network may form a multicast group at any given time. Each node may maintain at least a portion of a data structure that links all the participating nodes in the group. This structure may be a tree that may or may not overlap the underlying network tree, which is constituted by parent/child relationships among the nodes. When a node joins a multicast group, it links up with the multicast tree such that it has a best (i.e., most cost effective) path to the tree. While a multicast tree connects all the member nodes in a multicast group, non-member nodes may also be part of that tree. That may be the case, for example, when a remote node joins a multicast group while it is out of transmission range of all group members. Further, while it may be desirable to have the smallest multicast tree, it may not always be true during the lifetime of a multicast group.

According to the present invention, a joining node broadcasts JREQ (Join Request) with the destination address field set to the multicast group address. Upon receiving JREQ, a node may take the following actions:

An Off-Tree node sets up the reverse path, updates the path cost in the JREQ, and rebroadcasts JREQ if it receives the JREQ the first time, or it receives subsequent JREQs rendering a smaller forward cost.

A GM, GL, or On-Tree node of that multicast group sends a unicast JREP (Join Reply) towards the joining node if it receives the JREQ the first time, or it receives subsequent JREQs rendering a smaller forward cost. The GM, GL or On-Tree node, however, does not rebroadcast the join request to which it just responded.

The joining node can receive multiple JREPs, sent by several of GM, GL, or On-Tree nodes, each of which specifies a route to multicast tree along with the cost for that route. The joining node chooses a route with the lowest cost. The selected route does not automatically become active. Rather, the joining node needs to inform the nodes along the selected route that the route should become active. To do so, the joining node sends a MACT (Multicast Activation) frame along the selected route to activate the corresponding routing entries in the nodes along the selected route.

Figure 2:
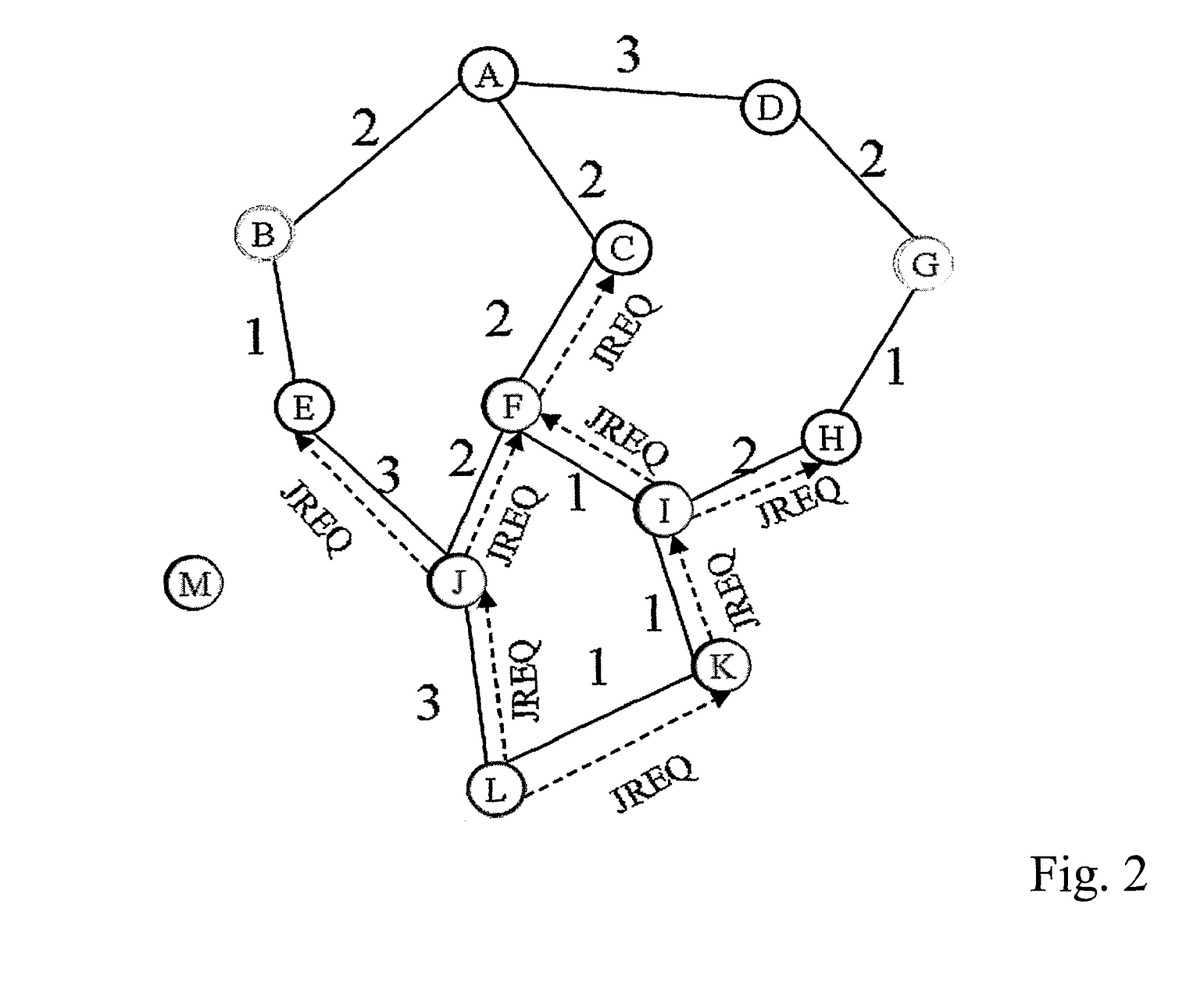
FIG. 2 is a diagram of JREQ message propagation through nodes in a communication network according to an embodiment of the present invention.
Figure 3:
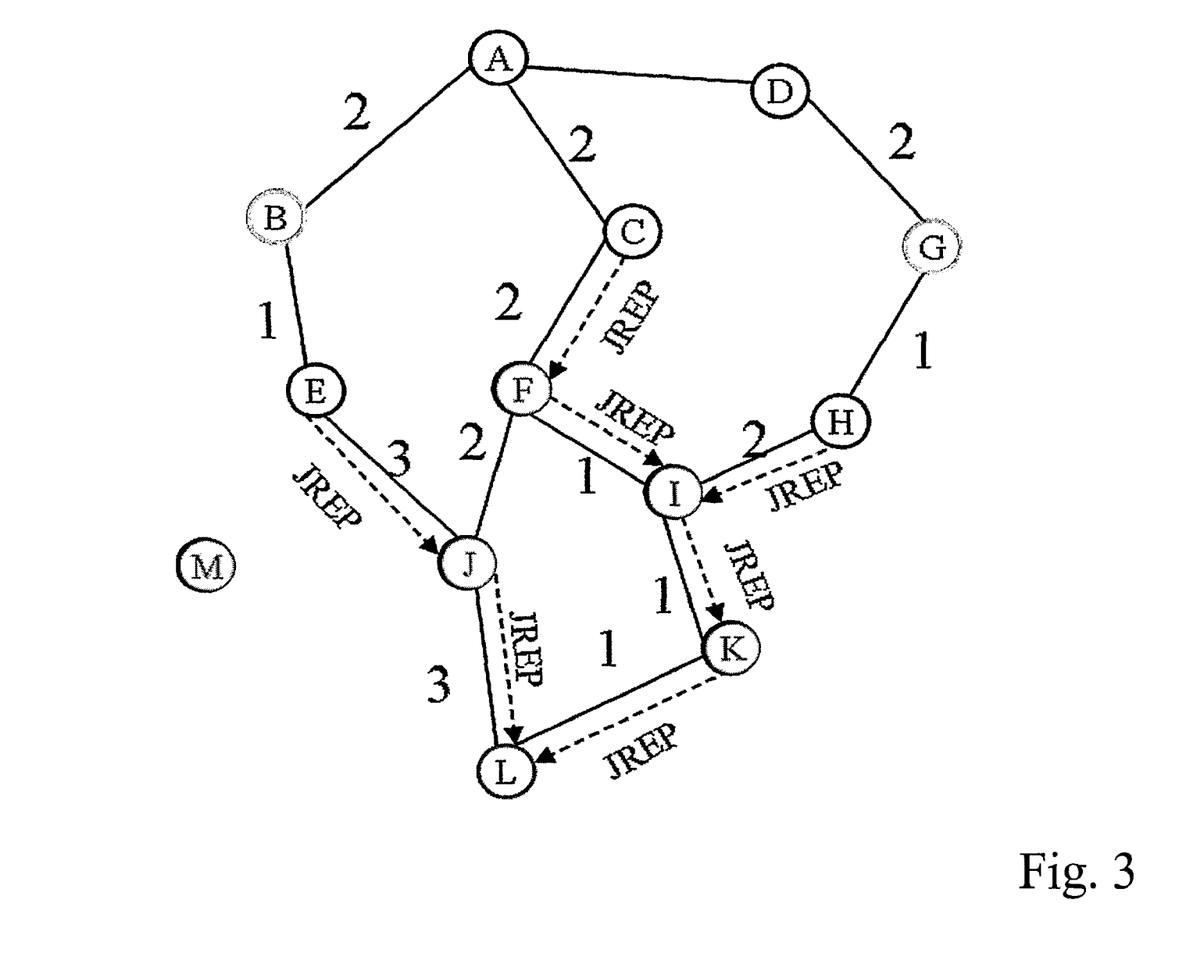
FIG. 3 is a diagram of JREP message propagation through nodes in a communication network according to an embodiment of the present invention.
Figure 4:
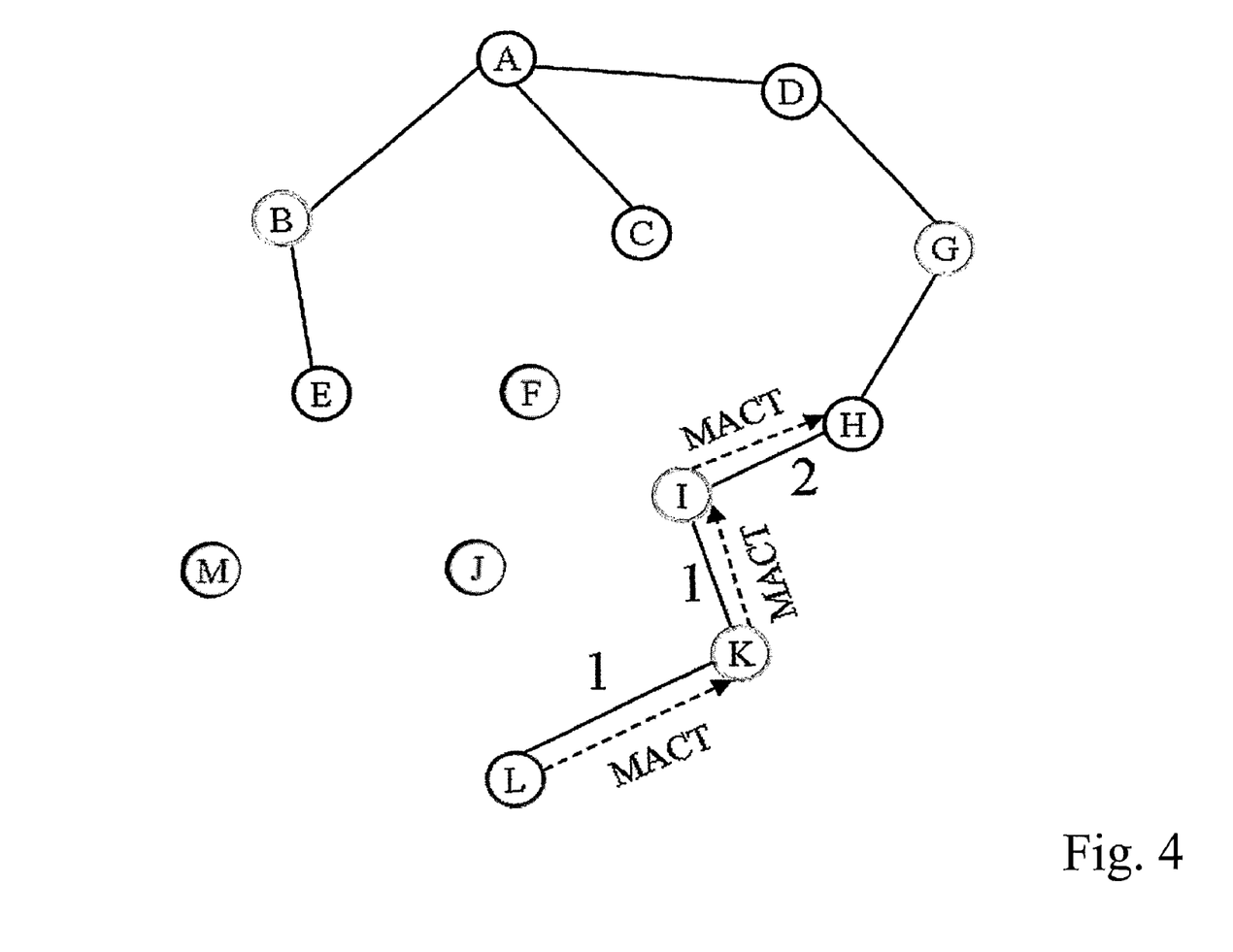
FIG. 4 is a diagram of MACT command propagation through nodes in a communication network according to an embodiment of the present invention.
Figure 5:
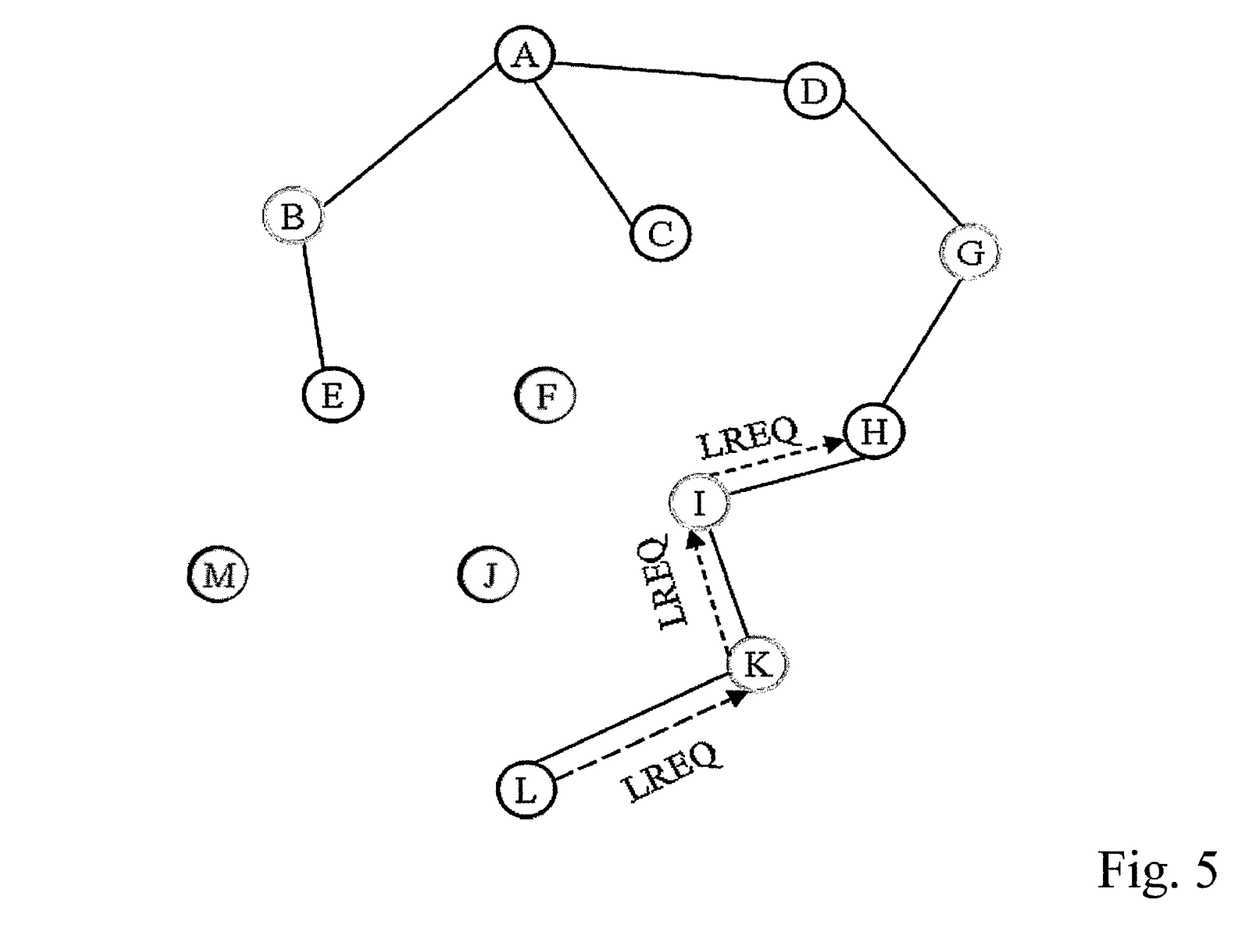
FIG. 5 is a diagram of LREQ message propagation through nodes in a communication network according to an embodiment of the present invention.

FIG. 2 shows an example of a portion of the method to create a multicast group according to an embodiment of the present invention. In this example, communication nodes A-M form a communication network and the nodes are configured to communicate according to the ZigBee network standard specification. A, C, D, E and H are GM nodes; B and G are On-Tree nodes (OnTN); F, I, J, K and M are Off-Tree Nodes (OffTN); and L is a joining node. FIGS. 3-5 show the same nodes during different stages or embodiments of the present invention. Dashed arrow lines represent a control message and solid numbered lines represent a link cost for a communication link between the connected nodes.

In FIG. 2, the joining node L broadcasts JREQ to its neighbor nodes J and K. Each node that receives the JREQ computes forward cost by adding link cost to a path cost provided in the JREQ. The path cost in the initial JREQ sent by L is set to 0. The link cost can be determined based on a function of several network or node related factors such as packet delay, link quality indicator (LQI), battery power levels and available buffer sizes of both nodes of the link, etc. For instance, ZigBee Network Specification V1.0 suggests a procedure to determine the link cost in unicast transfers using LQI.

If a node receives this JREQ for the first time, it may create an entry in a multicast discovery table for this request. The entry records the updated forward cost and sets up the reverse path. An Off-Tree Node (e.g., nodes J, K, I, F) rebroadcasts the JREQ with the updated accumulated path cost set to forward cost, if this JREQ is received for first time, or if the new updated forward cost is less than the previously recorded forward cost. For example, node J broadcasts JREQ to nodes E and F with path cost value of 3 in the JREQ, node F broadcasts to node C with path cost value of 5 (before re-broadcasting, it will add the link cost for J-F link to the cost received in the JREQ frame), node K broadcasts JREQ to node I with path cost value of 1 in the JREQ, node I broadcasts JREQ to node F and H with path cost value of 2 in the JREQ and so on. This process continues until JREQ reaches a node already on the multicast tree (e.g., nodes E, C and H).

FIG. 3 shows an example of JREP propagation during the process of creating a multicast group. When a GL, GM, or OnTN (node E, C, H in FIG. 3) receives a JREQ for the first time, it generates a JREP message, and sends a unicast JREP back towards the joining node along the reverse path. For example, node C generates JREP and sends it back to node F, node E generates JREP and sends it back to node J, node H generates JREP and sends it back to node I. If this JREQ was previously received, the receiving node updates its multicast discovery table, generates a new JREP, and sends it along the reverse path toward the joining node if the new cost is less than recorded one. Upon receiving a JREP, an intermediate node compares the path cost contained in JREP with the cost in its multicast discovery table. If the cost in the table is zero or it is greater than the cost in JREP frame, it records received path cost in the table, maintains a pointer to the node sending the JREP, and forwards the JREP frames along the reverse path. In FIG. 3, though node I receives JREP from node H and node F, it just records a pointer to node H for the future use when receiving message MACT because the path cost (2) in the JREP from H is smaller that the path cost (3) in the JREP from F.

After the joining node broadcasts the first JREQ and waits for a certain amount of time (e.g., nwkcRouteDiscoveryTime seconds as described in the ZigBee network standard specification, V1.0, incorporated by reference herein in its entirety), and if no JREP is received, the joining node rebroadcasts JREQ, possibly with multiple retries (for example nwkcRREQRetries times in ZigBee networks). If the joining node receives no JREP corresponding to its request, either the multicast group does not exist, or, if one exists, the physical network is fragmented. Thus, the joining node becomes the multicast group leader (GL). If it receives at least one JREP, it follows the procedure above to join the group.

In this example, the joining node L selects the best route among all JREP frames it received after sending a JREQ, by selecting the route with the lowest accumulated path cost based on the link costs found during forward propagation of the JREQ and reverse propagation of the JREP. Then, the joining node L updates its multicast routing table and sends out a MACT frame using a unicast transmission to the node from which it receives the JREP with the lowest path cost.

FIG. 4 shows an example of the propagation of the MACT used to establish a multicast group according to the present invention. Node L sends MACT to node K since the RREP from node K has the lowest path cost value of 4. The node receiving MACT enables the corresponding entry in its multicast route table by setting the node sending the MACT as a next hop node for the multicast group. If a GL, GM, or OnTN receives the MACT, it just adds the node sending the MACT as a next hop for the multicast group without further forwarding the MACT message. If an OffTN receives the MACT, it adds the node sending the MACT to the next hop list, forwards the MACT frame to the next hop node as recorded in its multicast discovery table. Forwarding of the MACT frame continues until it reaches the node that originated the JREP with the lowest path cost. In the example of FIG. 4, node K forwards the MACT to node I and node I forwards the MACT to node H. When H receives the MACT, it stops forwarding the MACT since node H is already on the multicast tree. Nodes that have generated or forwarded JREPs may delete the information associated with the multicast group in the multicast discovery table if they do not receive a MACT after a certain time period. As a result, the branch with the shortest cost from the joining node to the multicast tree is added to the multicast tree. FIG. 4 depicts how the joining node generates MACT and the nodes along the best path activate corresponding route entry in their multicast routing table.

FIG. 5 shows an example of a method of a leaf node leaving a multicast group. When a leaf node L seeks to leave the multicast group, node L unicasts a LREQ (Leave Request) message specifying the intended multicast group address to the next hop node specified in its multicast route table, and removes the corresponding entry from its multicast route table. The node that receives the LREQ deletes the entry for the sender node from its multicast route table. If the receiving node is a OnTN and becomes a leaf node, it prunes the multicast tree by removing itself from the tree. This prune process continues until either a member node or a non-leaf OnTN node is reached. If a Non-Leaf group member leaves the multicast tree, it just revokes its multicast membership and continues to stay as OnTN (e.g., operating as a router) for the multicast tree.

When node K, which is an OnTN, receives LREQ from L, it removes node L from the next hop list and forwards LREQ to node I since it will become a leaf node after node L leaves. Node I does the same operation. Finally LREQ reaches node H, which is a group member of the multicast group. Node H just removes node I from its next hop list and stops forwarding LREQ.

Further, in the multicast communication method of the present invention, there is a distinction between network level broadcast and MAC level broadcast. In conventional communication networks, system functionality is structured in layers. A well known seven-layer OSI model follows that approach. Each layer deals with a specific broad aspect of functionality. For a multi-hop wireless networking system, for example, the physical layer deals with functions of radio, the MAC layer ensures the sharing of the transmission medium (i.e. radio in this case), the network layer deals with routing of frames, and so on. Each lower layer offers services to its higher layer through a well-defined interface. A network layer, for example, transmits a frame in a unicast or broadcast fashion by passing it to the MAC along with the destination address. It should be noted that this destination address may or may not be the same as the address contained in the network header portion of the frame being passed to MAC. While sending a unicast frame to a remote node, for example, the network layer places the final destination address in the network header of the frame while passing the next hop address as destination address to MAC. Similarly network level broadcast and MAC level broadcast have different effects. A MAC level broadcast is a local broadcast. Thus, each node within the transmission range of the transmitting node will receive the broadcast frame and pass this frame to its network layer, which, in turn, will pass it to the higher layer. But in the case of a network level broadcast, each receiving node will re-broadcast the frame (if it has not already done so) to ensure that the frame propagates throughout the network. In other words, as opposed to a MAC level broadcast that is transmitted by only one node, a network level broadcast is network-wide broadcast with every node transmitting the same frame at least once. Therefore, network level broadcasts may be considered to be more costly than MAC broadcasts. The present invention minimizes the use of network level broadcasts.

The general format of the NWK frame in the present invention is the same as that of the ZigBee network specification V1.0. The general NWK frame is formatted as shown in Table 1 which is identical to FIG. 7 in ZigBee network specification V1.0.

TABLE 1

| NWK frame format | | | | | |
|---|---|---|---|---|---|
| Octets: 2 | 2 | 2 | 0/1 | 0/1 | Variable |
| Frame Control | Destination Address | Source Address | Broadcast Radius | Broadcast Sequence Number | Frame Payload |
| | | | Routing Fields | | |
| NWK Header | | | | | NWK Payload |

In order to specify multicast data packet in NWK header, the frame type field in 'Frame Control' field of NWK header is extended by the present invention to have the value of (10)b for a multicast data frame. The extended values of the frame type sub-field are shown in Table 2.

TABLE 2

| Values of the frame type sub-field | |
|---|---|
| Frame type value $b_1 b_0$ | Frame type name |
| 00 | Unicast data |
| 01 | NWK command |
| 10 | Multicast data |
| 11 | Reserved |

Destination address in a network header of a data frame is a multicast group address.

New commands are added for the multicast routing operation. The new command frames defined for multicast routing are listed in Table 3.

TABLE 3

| New NWK Command frames | |
|---|---|
| Command frame identifier | Command name |
| 0x04 | Join Request |
| 0x05 | Join Reply |
| 0x06 | Multicast Activation |
| 0x07 | Leave Request |

Join Request Command

The join request command allows a node to join a multicast group. Join request takes the identical format of route request in ZigBee network specification V1.0. The payload of a join request may be formatted as illustrated in Table 4.

TABLE 4

| Join request command format | | | | |
|---|---|---|---|---|
| Octets: 1 | 1 | 1 | 2 | 1 |
| Command frame identifier | Command options | Route request identifier | Destination address | Path cost |
| | | NWK payload | | |

Join Reply Command

The join reply command allows a node on the multicast tree to inform the originator of the join request that the request has been received. Join reply takes the identical format of route reply in ZigBee network specification V1.0. The payload of a join reply may be formatted as illustrated in Table 5.

TABLE 5

| Join reply command format | | | | | |
|---|---|---|---|---|---|
| Octets: 1 | 1 | 1 | 2 | 2 | 1 |
| Command frame identifier | Command options | Route request identifier | Originator address | Responder address | Path cost |
| | | NWK payload | | | |

Multicast Activation Command

Multicast activation command allows nodes to activate the route for a multicast group to add a branch from the joining node the multicast tree. The payload of a multicast activation command may be formatted as illustrated in Table 6.

TABLE 6

Multicast activation command format

| Octets: 1 | 1 | 2 |
|---|---|---|
| Command frame identifier | Route request identifier | Destination address |
| | NWK payload | |

Destination address field should be set to the multicast group address.

Leave Request Command

A node leaves a multicast group by sending a leave request command. The payload of a leave request may be formatted as illustrated in Table 7.

TABLE 7

Leave request command format

| Octets: 1 | 2 |
|---|---|
| Command frame identifier | Multicast group address |
| | NWK payload |

A ZigBee router according to the present invention may maintain a multicast routing table to facilitate construction of multicast trees and multicast data packet transmissions. An example of a data structure to store such a ZigBee standard specification compliant multicast routing table is shown in Table 8.

TABLE 8

Multicast routing table

| Field name | Size | Description |
|---|---|---|
| Multicast group address | 2 bytes | The multicast group ID |
| Next hop list | variable | The addresses of neighbor nodes on the multicast tree |
| Membership Status | 1 byte | The relationship between the node and the multicast group<br>1: member of the multicast group (GM)<br>0: OnTN |

During the process of a node joining a multicast group, a ZigBee router becoming part of the multicast tree may add an entry to the multicast routing table corresponding to the multicast group address. The next hop list of the entry records the addresses of neighbor nodes on the multicast tree. The membership status of the entry indicates whether this node is a member of the multicast group. When nodes join or leave the multicast group, the fields of the entry may be updated. When an entry is no longer needed, it may be deleted from the multicast routing table. For example, an entry is no longer needed when a leaf member node leaves the multicast group, or when an OnTN becomes a leaf node after a node leaves the multicast group.

The address space for multicast group addresses according to the present invention may be shared with the normal address space (that is used to assign the addresses to nodes) or it may be an exclusively reserved address space. Nodes in a ZigBee compliant network get a 16-bit address, called network address, in the range of 0x0000 through 0xFFFF. If this address space is shared between the node addresses and multicast group addresses, it is possible for a node to have the same network address as the group address of an existing multicast group in the network. However, such an arrangement does not cause address conflict because a flag in the network header of each frame that gets transmitted according to the present invention may indicate that the destination address of that frame is a single node or a group of nodes. So the combination of that flag and the destination address of a given frame uniquely define one or more recipients of that frame. On the other hand, if an exclusive set of addresses is reserved for the multicast group, it bars the nodes to assign any of that address space as network addresses for a node.

In order to send a data frame to a multicast group, an originating node sends a packet including the multicast address as the destination address, and with an indication that the packet is a multicast packet in the network layer (NWK) header by setting the frame type field in 'Frame Control' field of NWK header to (10)b. If the sending node has only one other node in its table for this multicast group, it sends the frame to next hop via a MAC unicast transmission; otherwise, it transmits the frame via a MAC broadcast. The node receiving the data packet will determine whether this packet is a multicast data packet. For example, the receiving node may determine that the received packet is a multicast data packet by the value of the frame type field in the 'Frame Control' field of the NWK header of the received data packet. The receiving node may also determine that the received packet is a multicast data packet if the destination address lies in a reserved multicast group address range. If the received packet is not a multicast packet, the packet will be processed as a regular non-multicast frame. If the received packet is a multicast packet, the receiving node will decide what it should do next based on contents of the receiving node's multicast route table. Note that a node may know whether it is a member of a multicast group through other means as well, for example through the application layer. A receiving GL or GM node passes the received frame to higher layer (e.g., application layer). If the receiving node is not a leaf node, and if there is only one additional next hop node (other than the node that sent the frame) in the multicast tree as indicated by the entry in the multicast route table associated with the destination address, the receiving node forwards the received frame to the next hop node via a MAC unicast transmission. Otherwise, the receiving node transmits the received frame via a MAC broadcast.

Thus, the present invention resolves issues in conventional networks regarding how packets are transmitted in the multicast tree via appropriate MAC transmission mechanisms. The protocol of the present invention also differs from MAODV in terms of command message formats. While MAODV uses the same RREQ, RREP command frame types as defined in unicast routing for multicast join request and corresponding reply packets, the present invention defines new frame types, i.e. JREQ and JREP. Also, in MAODV, a node uses MACT to activate a selected route as well as while leaving a multicast group. In the present invention, a leaving node uses LREQ frame to let others know that it is leaving.

Figure 6:
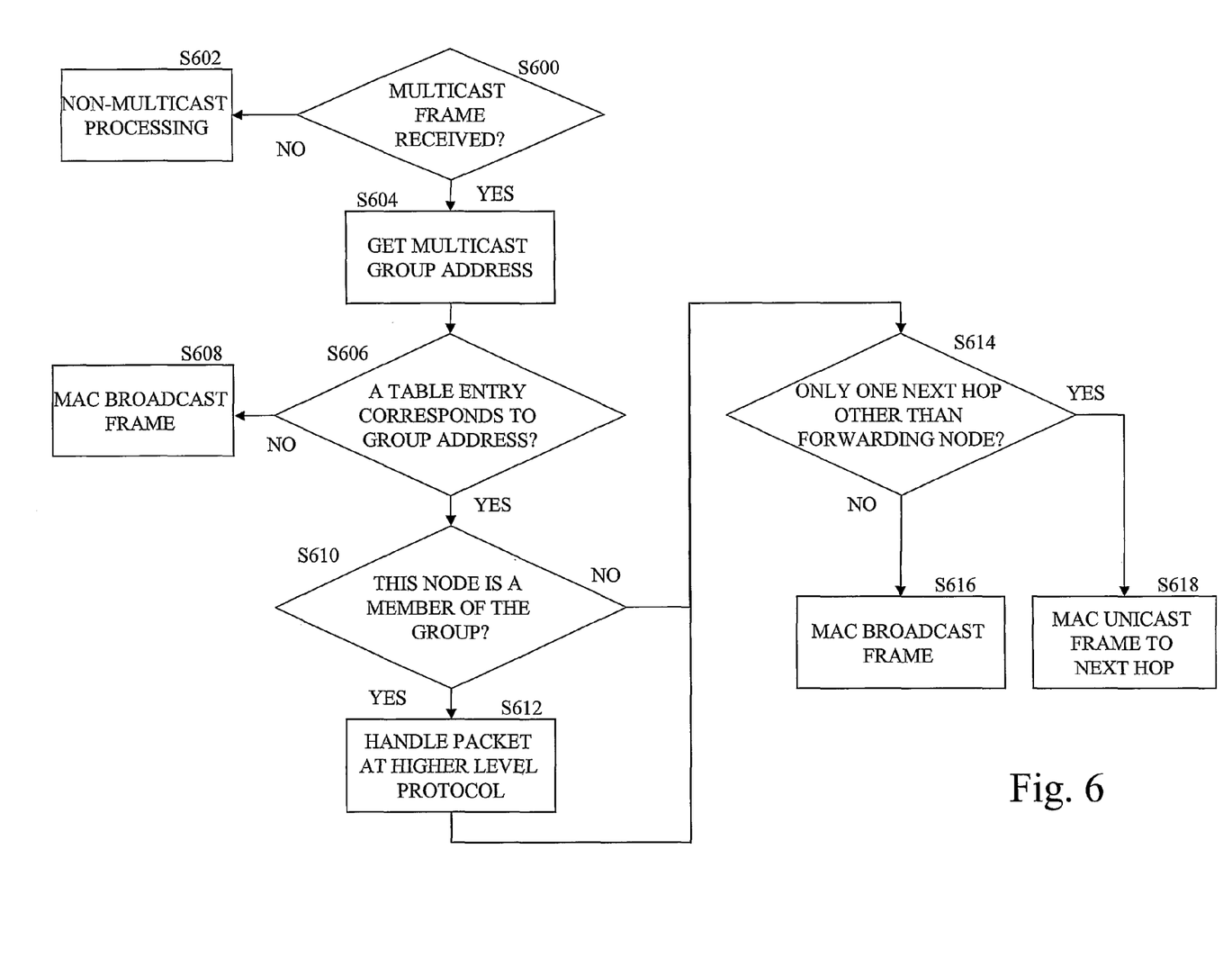
FIG. 6 is a flow diagram of a method of multicast communication according to an embodiment of the present invention.

FIG. 6 shows an embodiment of a method of handling multicast data transmission at a node upon receipt of a data packet. In particular, in S600, when a data frame is received that does not include a multicast data packet, non-multicast processing of S602 is performed. If the received frame has multicast data, the multicast group address is retrieved from the destination address field of the NWK header in S604. If the multicast route table does not include an entry corresponding to this multicast group address in S606, then the frame is broadcast to other nodes using the MAC broadcast feature in S608. If the multicast route table includes an entry corresponding to this multicast group address, it is determined if this node is a member of the addressed multicast group in S610. If this node is a member of the addressed multicast group, the packet is first passed to a higher protocol level in S612. If there is only one next hop node other than the one that forwarded this packet as determined from the multicast route table in S614, then the frame is sent to the next hop node using the MAC unicast facility in S618. Otherwise, the frame is broadcast using the MAC broadcast facility.

Thus, during the multicast data transmission, each node on the group tree transmits a frame only exactly once. That is a significant improvement over conventional protocols that use either network level broadcasts or multiple unicast transmissions by each node (on the group tree), one along each outgoing link.

The present invention includes processing of received signals, and signals to be transmitted, as well as programs by which the signals are processed. Such programs are typically stored and executed by a processor in a wireless device implemented in VLSI. The processor typically includes a computer program product for holding instructions programmed and for containing data structures, tables, records, or other data. Examples are computer readable media such as compact discs, hard disks, floppy disks, tape, magneto-optical disks, PROMs (EPROM, EEPROM, flash EPROM), DRAM, SRAM, SDRAM, or any other magnetic medium, or any other medium from which a processor can read.

The computer program product of the invention may include one or a combination of computer readable media to store software employing computer code devices for controlling the processor. The computer code devices may be any interpretable or executable code mechanism, including but not limited to scripts, interpretable programs, dynamic link libraries (DLLs), Java classes, and complete executable programs. Moreover, parts of the processing may be distributed within plural processors in a single wireless device, or alternatively may be distributed across plural wireless devices, for better performance, reliability, and/or cost.

The multicast protocol of the present invention incurs minimal extra overhead in network traffic. This overhead is due to (i) the increase in control frame size, and (ii) extra traffic volume generated by control messages. JREQ and JREP use the same frame format as RREQ and RREP, respectively, in ZigBee V1.0 unicast routing, and these frames differ from each other only in terms of command frame identifier and function. On the other hand, MACT and LREQ command frames have relatively short frame sizes. When a node tries to join a multicast group, the number of JREQ command frames transmitted in network is comparable to the number of frames transmitted when a node tries to discover a route by using unicast route discovery. However, since multiple nodes in a multicast tree can generate JREP command frames, it may introduce some additional communication overhead compared to that generated by RREP command frames when a node tries to discover a route to another node. It may also be pointed out that a join operation to a larger multicast group causes relatively less communication overhead as opposed to while joining a smaller multicast group.

The present protocol is applicable to any multi-hop short-range wireless network, and is especially suited and readily adaptable to ZigBee wireless sensor networks. This protocol may be backward compatible to existing ZigBee protocol and can easily be implemented as an extension to the ZigBee unicast routing. The proposed protocol is robust enough against the failure or break down of ZigBee coordinator device. While the protocol facilitates existence of a multicast tree, which links all member nodes of that group, the tree may not necessarily overlap the underlying address tree. That property not only makes this protocol robust and flexible in the dynamic topology of a ZigBee network but also more concise and efficient. The protocol is cognizant of the difference between MAC level broadcasts and broadcasts at a network layer level and minimizes the communication overhead by selectively using MAC broadcasts where possible. Also, during the transmission of data frames across a multicast group, each node may dynamically decide to use either a unicast or MAC broadcast transmission.

The present invention may resolve problems that are not resolved by MAODV. Further, the present invention includes a multicast solution that is suitable for specific communication networks, such as communication networks including nodes operating according to the ZigBee network standard specification.

MAODV disadvantageously relies on a simple hop count as a measure of routing cost. The present invention may select a best path based on a path cost metric that is a sum of the link costs of the links along the path. Link cost reflects the quality of the link.

The use of path cost enables the present method to pick a branch (e.g., route segment) that is best suited to the joining node given the real network conditions.

The existing ZigBee network standard specification does not include a multicast communication method. However, the present inventors have realized that such a capability may be useful. For instance, using multicast communication according to the present invention, a command can be issued to light controlling ZigBee device nodes such that only a particular group of lights are turned on or off in a building. Multicast routing according to the present invention allows transmission of packets from a source to all member nodes in a particular multicast group, whereby at each node only one transmission of a packet is needed.

Advantages of the present method may include simplicity and efficiency. The present method may be more simple than conventional approaches by constructing a shared multicast tree among group members with minimal control message overhead.

Further, the present multicast routing protocol employs efficient distributed mechanism since it may be independent of a ZigBee coordinator, may function even in the presence of a broken ZigBee address tree, and may utilize unicast or broadcast transmissions adaptively. Further, the present method is compatible with existing ZigBee unicast routing, requiring minimal changes in code and data structures.

Although it is described in the context of ZigBee networks, the multicast routing protocol described herein may also be applied to general wireless ad hoc networks. One of skill in the art should understand that the embodiments discussed herein show just one particular scenario where the multicast routing protocol is applicable.

Numerous modifications and variations of the present invention are possible in light of the above teachings. It is therefore to be understood that within the scope of the appended claims, the invention may be practiced otherwise than as specifically described herein.

The invention claimed is:

1. A method for multicast communication in a network having plural nodes according to the ZigBee network specification, said method comprising:
  creating a multicast group that includes a subset of the plural nodes and excludes at least one non-member node in the plural nodes, said multicast group having a multicast address, wherein the creating further comprises:
    sending a join request (JREQ) message from a joining node seeking to join the multicast group to a receiving node; and sending a join reply (JREP) message from the receiving node to the joining node, the JREP message including a path cost to a node in the multicast group from the joining node;

forwarding an updated JREQ message from the receiving node to another node if the receiving node is not a member of the multicast group, the updated JREQ message including a sum of a link cost included in the JREQ message and a link cost of a communication link between the joining node and the receiving node;

receiving another JREP message from the another node, the another JREP message including a path cost to a node in the multicast group from the receiving node; and setting the path cost in the JREP to be sent to the joining node by the receiving node to be a sum of the path cost included in the another JREP message and a link cost between the joining node and the receiving node;

transmitting a multicast message including the multicast address; and receiving the multicast message at each node in the multicast group.

2. The method of claim 1, wherein the creating further comprises:

sending a multicast activation (MACT) command from the joining node to the receiving node to activate the multicast group.

3. The method of claim 1, further comprising:

sending a leave request (LREQ) command from the joining node to the receiving node indicating that the joining node seeks to leave the multicast group.

4. The method of claim 1, wherein the receiving further comprises:

receiving the multicast message at a first node;

determining if a second node within a transmit radio range of the first node is the only node within the transmit radio range of the first node that is also a member of the multicast group; and forwarding the multicast message to the second node using a MAC unicast protocol or a MAC broadcast protocol based on the determining.

5. The method of claim 4, wherein the determining further comprises:

storing a routing table at the first node, the routing table including an address for each node within a transmit radio range of the first node that is a member of a respective multicast group; and determining if the second node is a member of the multicast group based on the routing table.

6. The method of claim 1, wherein the sending the JREQ message further comprises sending a message having a same format as a ZigBee standard route request (RREQ) message.

7. The method of claim 1, wherein the sending the JREP message further comprises sending a message having a same format as a ZigBee standard route reply (RREP) message.

8. The method of claim 1, wherein the transmitting further comprises transmitting a message having a ZigBee standard command frame type (10)b in a frame control field.

9. The method of claim 1, wherein the sending the JREQ message includes sending a message having a ZigBee standard command frame identifier of 0x04.

10. The method of claim 1, wherein the sending the JREP message includes sending a message having a ZigBee standard command frame identifier of 0x05.

11. The method of claim 2, wherein the sending the MACT command includes sending a command having a ZigBee standard command frame identifier of 0x06.

12. The method of claim 3, wherein the sending the LREQ command includes sending a command having a ZigBee standard command frame identifier of 0x07.

13. The method of claim 1, wherein sending the JREP further comprises:

calculating the path cost based on at least one of a packet delay, a link quality indicator, a node battery power level, and an available node buffer size.

14. A method for multicast communication in a network having plural nodes, said method comprising:

creating a multicast group that includes a subset of the plural nodes and excludes at least one non-member node in the plural nodes, said multicast group having a multicast address, wherein the creating further comprises:

sending a join request (JREQ) message from a joining node seeking to join the multicast group to a receiving node; and sending a reply (JREP) message from the receiving node to the joining node, the JREP message including a path cost to a node in the multicast group from the joining node;

forwarding an updated JREQ message from the receiving node to another node if the receiving node is not a member of the multicast group, the updated JREQ message including a sum of a link cost included in the JREQ message and a link cost of a communication link between the joining node and the receiving node;

receiving another JREP message from the another node, the another JREP message including a path cost to a node in the multicast group from the receiving node; and setting the path cost in the JREP to be sent to the joining node by the receiving node to be a sum of the path cost included in the another JREP message and a link cost between the joining node and the receiving node;

transmitting a multicast message including the multicast address; and receiving the multicast message at each node in the multicast group.

15. A node apparatus in a network having plural nodes according to the ZigBee network specification, said node comprising:

a multicast group creating section configured to create a multicast group that includes a subset of the plural nodes and excludes at least one non-member node in the plural nodes, said multicast group having a multicast address;

a multicast message transmitting section configured to transmit a multicast message to the multicast group including the multicast address;

a join request (JREQ) sending section configured to send a message to join the multicast group;

a join reply (JREP) receiving section configured to receive a JREP message from a neighbor node including a path cost to a member node in the multicast group;

a forwarding section configured to forward an updated JREQ message to another node if the node apparatus is not a member of the multicast group, the updated JREQ message including a sum of a link cost included in the JREQ message and a link cost of a communication link to the neighbor node;

a receiving section configured to receive another JREP message from the another node, the another JREP message including a path cost to the member node in the multicast group; and a setting section configured to set the path cost in the JREP to be a sum of the path cost included in the another JREP message and the link cost of a communication link to the another node.

16. The apparatus of claim 15, further comprising:
a multicast activation (MACT) command sending section configured to send a MACT command to activate the multicast group.

17. The apparatus of claim 15, further comprising:
a leave request (LREQ) command sending section configured to send a LREQ command to indicate the node apparatus seeks to leave the multicast group.

18. The apparatus of claim 15, further comprising:
a determining section configured to determine if a second node within a transmit radio range is the only node within the transmit radio range that is also a member of the multicast group; and
a forwarding section configured to forward the multicast message to the second node using a MAC unicast protocol or a MAC broadcast protocol based on the determining section.

19. The apparatus of claim 18, further comprising:
a routing table configured to store an address for each node within the transmit radio range that is a member of a respective multicast group, wherein the determining section is further configured to determine if the second node is a member of the multicast group based on the routing table.

20. The apparatus of claim 15, wherein a format of the JREQ message is the same as a format of a ZigBee standard route request (RREQ) message.

21. The apparatus of claim 15, wherein a format of the JREP message is the same as a format of a ZigBee standard route reply (RREP) message.

22. The apparatus of claim 15, wherein the multicast message transmitting section is further configured to transmit a message having a ZigBee standard command frame type (10)b in a frame control field.

23. The apparatus of claim 15, wherein the JREQ message includes a message having a ZigBee standard command frame identifier of 0x04.

24. The apparatus of claim 15, wherein the JREP message includes a message having a ZigBee standard command frame identifier of 0x05.

25. The apparatus of claim 16, wherein the MACT command includes a command having a ZigBee standard command frame identifier of 0x06.

26. The apparatus of claim 17, wherein the LREQ command includes a command having a ZigBee standard command frame identifier of 0x07.

27. The apparatus of claim 15, wherein the path cost includes at least one of a packet delay, a link quality indicator, a node battery power level, and an available node buffer size.

28. A communication system comprising:
plural nodes according to the ZigBee network specification, each node comprising:
a multicast group creating section configured to create a multicast group that includes a subset of the plural nodes and excludes at least one non-member node in the plural nodes, said multicast group having a multicast address; and
a multicast message transmitting section configured to transmit a multicast message to the multicast group including the multicast address;
a join request (JREQ) sending section configured to send a JREQ message to join the multicast group;
a join reply (JREP) receiving section configured to receive a JREP message from a neighbor node including a path cost to a member node in the multicast group;
a forwarding section configured to forward an updated JREQ message to another node if the node apparatus is not a member of the multicast group, the updated JREQ message including a sum of a link cost included in the JREQ message and a link cost of a communication link to the neighbor node;
a receiving section configured to receive another JREP message from the another node, the another JREP message including a path cost to the member node in the multicast group; and
a setting section configured to set the path cost in the JREP to be a sum of the path cost included in the another JREP message and the link cost of a communication link to the another node.

29. The system of claim 28, wherein each node further comprises:
a multicast activation (MACT) command sending section configured to send a MACT command to activate the multicast group.

30. The system of claim 28, wherein each node further comprises:
a leave request (LREQ) command sending section configured to send a LREQ command to indicate the node seeks to leave the multicast group.

31. The system of claim 28, wherein each node further comprises:
a determining section configured to determine if a second node within a transmit radio range is the only node within the transmit radio range that is also a member of the multicast group; and
a forwarding section configured to forward the multicast message to the second node using a MAC unicast protocol or a MAC broadcast protocol based on the determining section.

32. The system of claim 31, wherein each node further comprises:
a routing table configured to store an address for each node within the transmit radio range that is a member of a respective multicast group, wherein the determining section is further configured to determine if the second node is a member of the multicast group based on the routing table.

33. The system of claim 29, wherein the MACT command includes a command having a ZigBee standard command frame identifier of 0x06.

34. The system of claim 30, wherein the LREQ command includes a command having a ZigBee standard command frame identifier of 0x07.

* * * * *